(12) United States Patent
Teraoka et al.

(10) Patent No.: US 11,059,118 B2
(45) Date of Patent: Jul. 13, 2021

(54) CORDLESS SOLDERING IRON

(71) Applicant: Hakko Corporation, Osaka (JP)

(72) Inventors: Yoshitomo Teraoka, Osaka (JP); Kenta Nakamura, Osaka (JP)

(73) Assignee: Hakko Corp., Osaka (JP)

( * ) Notice: Subject to any disclaimer, the term of this patent is extended or adjusted under 35 U.S.C. 154(b) by 369 days.

(21) Appl. No.: 16/142,052

(22) Filed: Sep. 26, 2018

(65) Prior Publication Data

US 2019/0134730 A1 May 9, 2019

Related U.S. Application Data

(60) Provisional application No. 62/566,676, filed on Oct. 2, 2017.

(51) Int. Cl.
*B23K 3/00* (2006.01)
*B23K 3/03* (2006.01)

(52) U.S. Cl.
CPC ............ *B23K 3/0323* (2013.01); *B23K 3/033* (2013.01)

(58) Field of Classification Search
CPC .... B23K 3/0323; B23K 3/0307; B23K 3/027; B23K 3/033; B23K 3/08; B23K 3/0315; B23K 3/0376; B23K 1/0016; B23K 2101/42; B23K 31/125; B23K 3/025; B23K 3/0353
See application file for complete search history.

(56) References Cited

U.S. PATENT DOCUMENTS

| | | | |
|---|---|---|---|
| 4,999,480 A * | 3/1991 | Smith | B23K 3/027 219/228 |
| 2005/0247692 A1* | 11/2005 | Axinte | B23K 3/0307 219/240 |
| 2008/0169910 A1* | 7/2008 | Greene | H02J 50/20 340/10.34 |
| 2017/0173719 A1* | 6/2017 | Nguyen | B23K 3/0353 |

* cited by examiner

*Primary Examiner* — Erin B Saad
(74) *Attorney, Agent, or Firm* — David B. Abel

(57) ABSTRACT

A cordless, hand held soldering iron operable with a control station providing wireless temperature control functionality and a charging station.

21 Claims, 14 Drawing Sheets

CORDLESS SOLDERING IRON

FIELD OF THE INVENTION

The present invention relates to the field of soldering devices and more particularly to a cordless soldering iron and associated control station providing wireless control of the operation of the soldering iron, and a battery charging station operative with the cordless soldering iron.

BACKGROUND AND RELATED ART

Present industrial or factory soldering stations typically include a control station that connects to a soldering iron via a cable. Sometimes the cable connecting the soldering iron to the control station gets in the way of the work and the cord may also interfere with another person's soldering if two workers sit next to each other. To address the limitations of the cable connecting the soldering iron to a control station some cordless soldering irons have been developed. Usually cordless soldering irons have a battery so that they tend to be larger than the hand held soldering irons having a cord connected to a control station. The extra weight of the battery for the present cordless soldering irons make them heavy, and repetitive use of a heavy hand tool in the industrial soldering environment makes the user tired. In addition, functionalities not directly related to melting solder are not present in the conventional cordless soldering irons.

For example, conventional cordless soldering irons generally do not have feedback function to control the tip temperature during the soldering operations, resulting in large changes in the tip temperature during the soldering process. If the tip temperature cannot be maintained at a desired level during a soldering process, the resulting solder connection may be degraded or even ineffective. In addition, conventional cordless soldering irons do not have an associated control device to allow the input of a target tip temperature. Because there are known risks in soldering operations with inaccurate solder tip temperatures, there is a need for a cordless soldering iron that includes an accurate and timely tip temperature control capability.

BRIEF DESCRIPTION OF THE INVENTION

The present invention provides a cordless soldering iron and associated control station which includes a tip temperature feedback function and temperature setting and temperature adjustment control to adjust and maintain the temperature of the soldering tip during soldering procedures. The cordless soldering iron includes a wireless communication circuit to wirelessly connect the soldering iron to the control station throughout the soldering processes. In addition, the cordless soldering iron is configured to be compatible with docking in a charging station to recharge the battery of the cordless soldering iron while the heated soldering tip is contained in a manner to protect the user from inadvertently contacting the soldering tip.

DETAILED DESCRIPTION OF THE INVENTION

Figure 1:
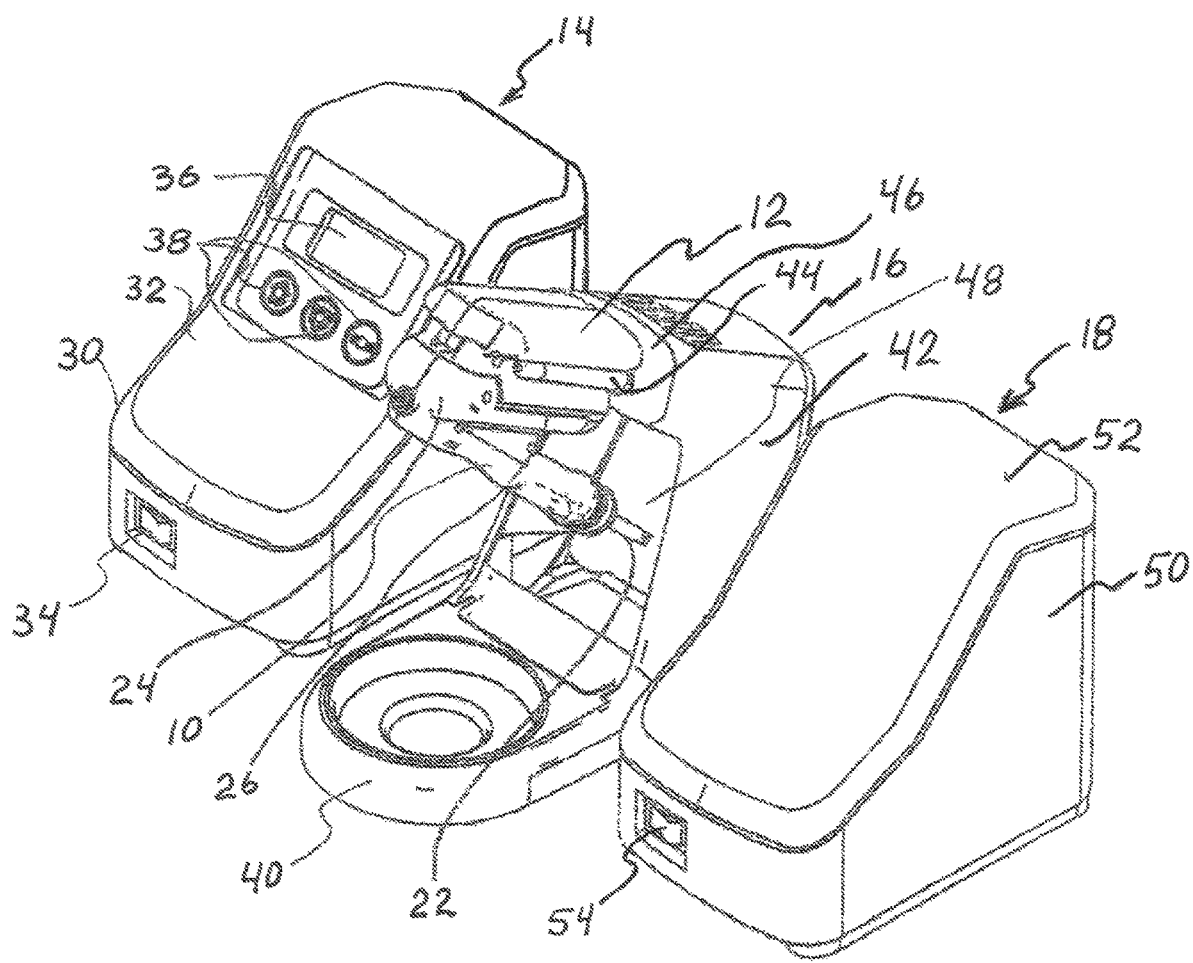
FIG. 1 is a perspective view of an embodiment of the cordless soldering iron, control station and charging station of the present invention

FIG. 1 is a perspective view of the cordless soldering iron 10, associated battery 12, a control station 14, a soldering iron holder 16 which may include a soldering iron power supply and battery charger functionality, and a charge station 18. The cordless soldering iron 10 includes a soldering iron cartridge 22 and a grip 24 having an integral base 26 configured to allow removable attachment to an ergonomically compatible power supply battery pack 28 containing the battery 12. The battery 12 is preferably a rechargeable battery. The power supply battery pack may have a shape allowing the recharging of the battery 12 with a power tool battery charger.

The control station 14 includes a housing 30 with a front panel 32 on the upper top surface of the housing 30. A power switch 34 may be positioned on the front of the housing 30 as shown in FIG. 1, or the power switch could be positioned on the front panel 32. The front panel 32 preferably includes a display 36, for example a light emitting diode (LED) or liquid crystal display (LCD), as well as input buttons 38. The input buttons 38 may include, for example, an up arrow, a down arrow and a function button. The function button can be used to select the information shown on the display 36, for example the tip temperature setting, and the arrows may be operated to adjust the tip temperature setting up or down, as appropriate.

The soldering iron holder 16 includes a bottom section 40 and an upright portion 42 secured to the bottom section 40. The upright portion 42 includes a pair of rods 44, projecting from a top face 46 of the upright portion 42. The pair of rods 44 to support the power supply battery pack 28 of the cordless soldering iron 10 when it is docked on the soldering iron holder 16. The upright portion 42 of the soldering iron holder 16 may also include a recess or opening 48 into which the soldering iron cartridge 22 of the cordless soldering iron 10 may project and be protected when the cordless soldering iron 10 is positioned upon the soldering iron holder 16.

The charge station 18 depicted in FIG. 1 may be provided as an alternative to the control station 14, as described below. The charge station 18 includes a housing 50 and a top panel 52, with a power switch 54 on the front of the housing 50 as shown, or alternatively on the top panel 52.

Figure 2:
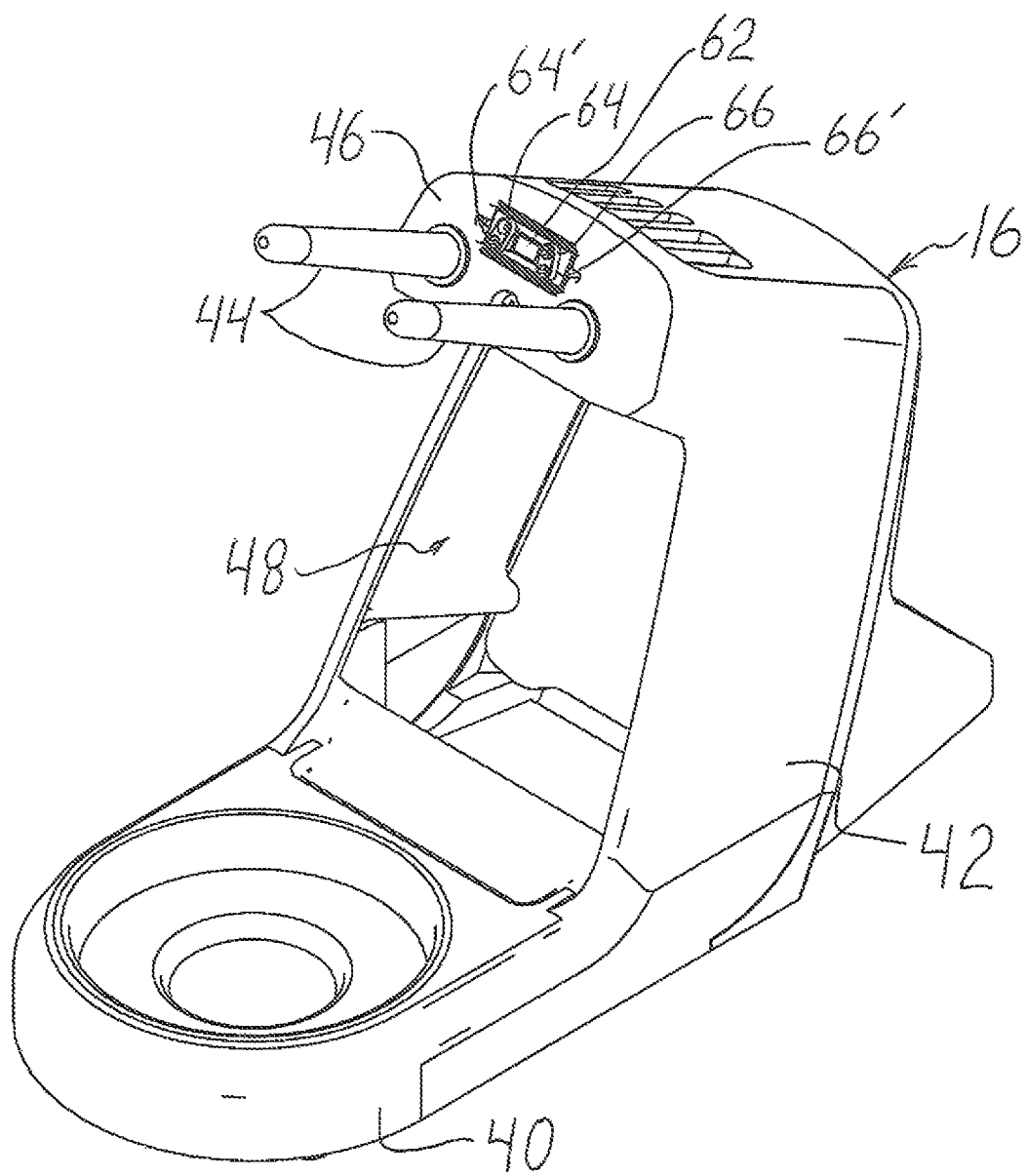
FIG. 2 is a front perspective view of the soldering iron holder.
Figure 3:
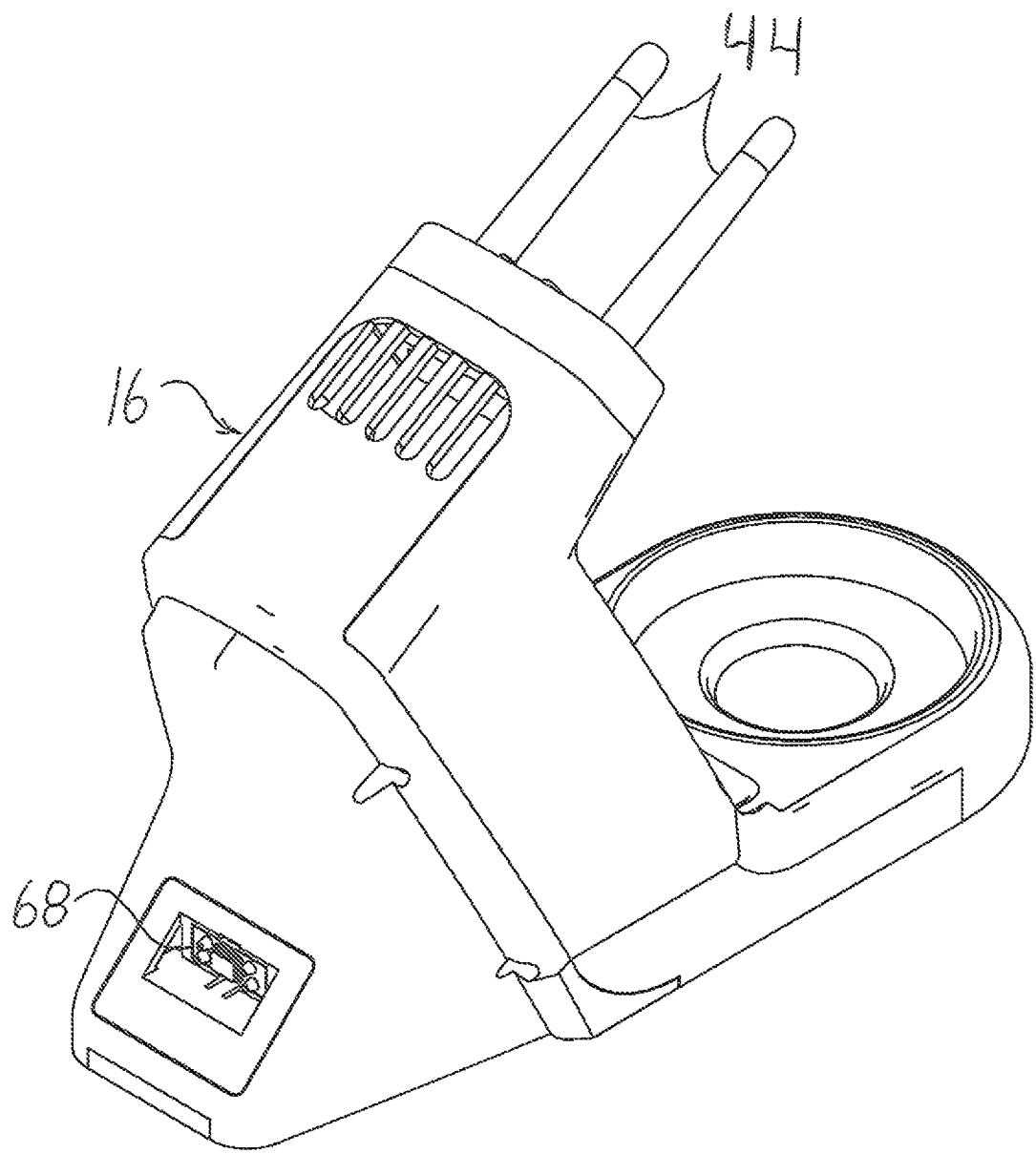
FIG. 3 is a rear perspective view of the soldering iron holder.

FIG. 2 is a front perspective view and FIG. 3 is a rear perspective view of the soldering iron holder 16 without the cordless soldering iron 10 or power supply battery pack 28. The soldering iron holder of FIGS. 2 and 3 include the bottom section 40 and the upright portion 42 having the pair of rods 44 projecting from the top face 46 of the upright portion 42. As also depicted in FIG. 2, the top face 46 includes a magnet 62 as well as charging contacts 64 and 64' and supply contacts 66 and 66' positioned so as to electrically connect to power supply battery pack 28. The rear perspective view of FIG. 3 also depicts a cable connector 68 that accommodates a cable (not shown) to interconnect the soldering iron holder 16 to the control station 14.

Figure 4:
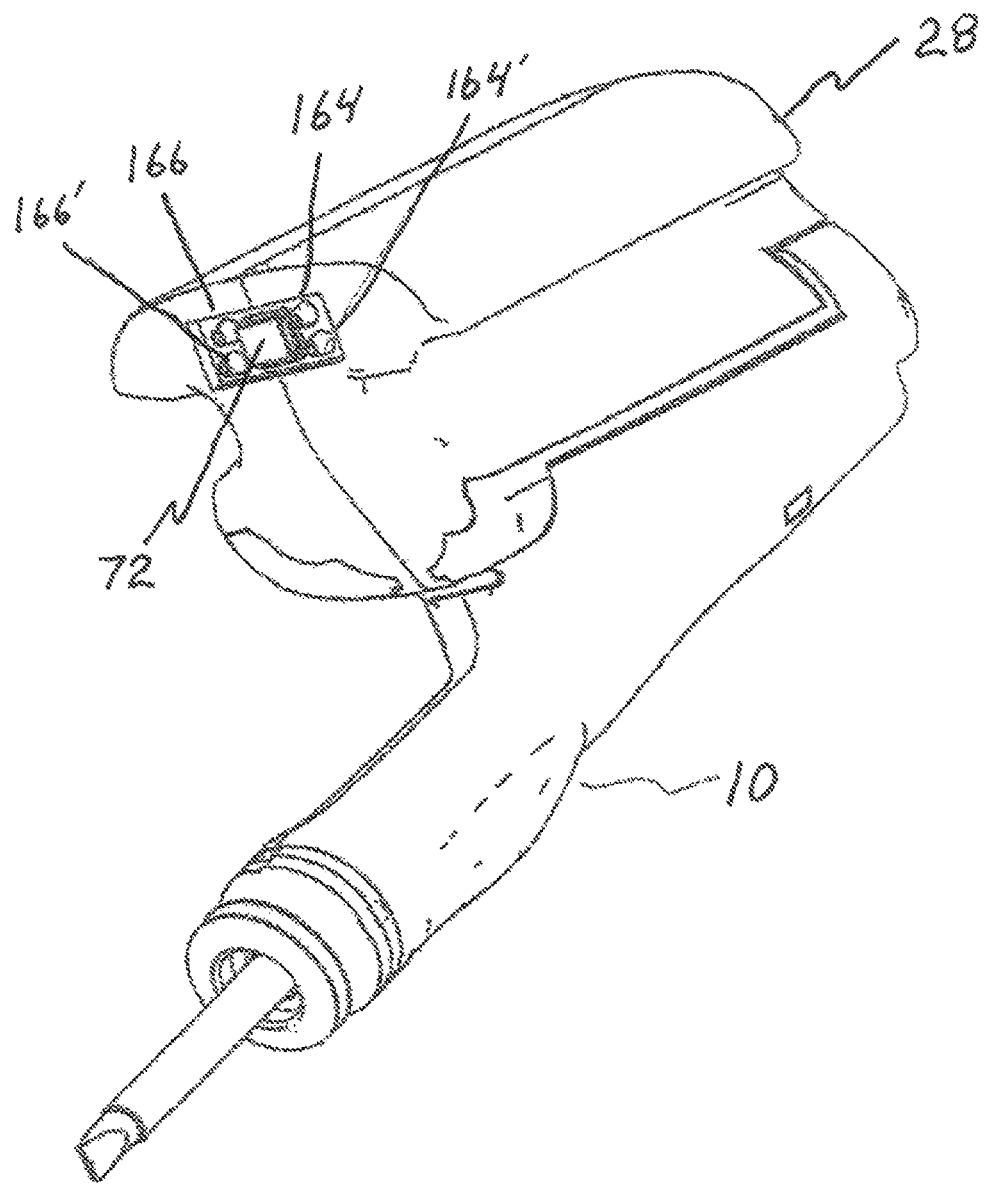
FIG. 4 is a front perspective view of the cordless soldering iron and battery pack.
Figure 5:
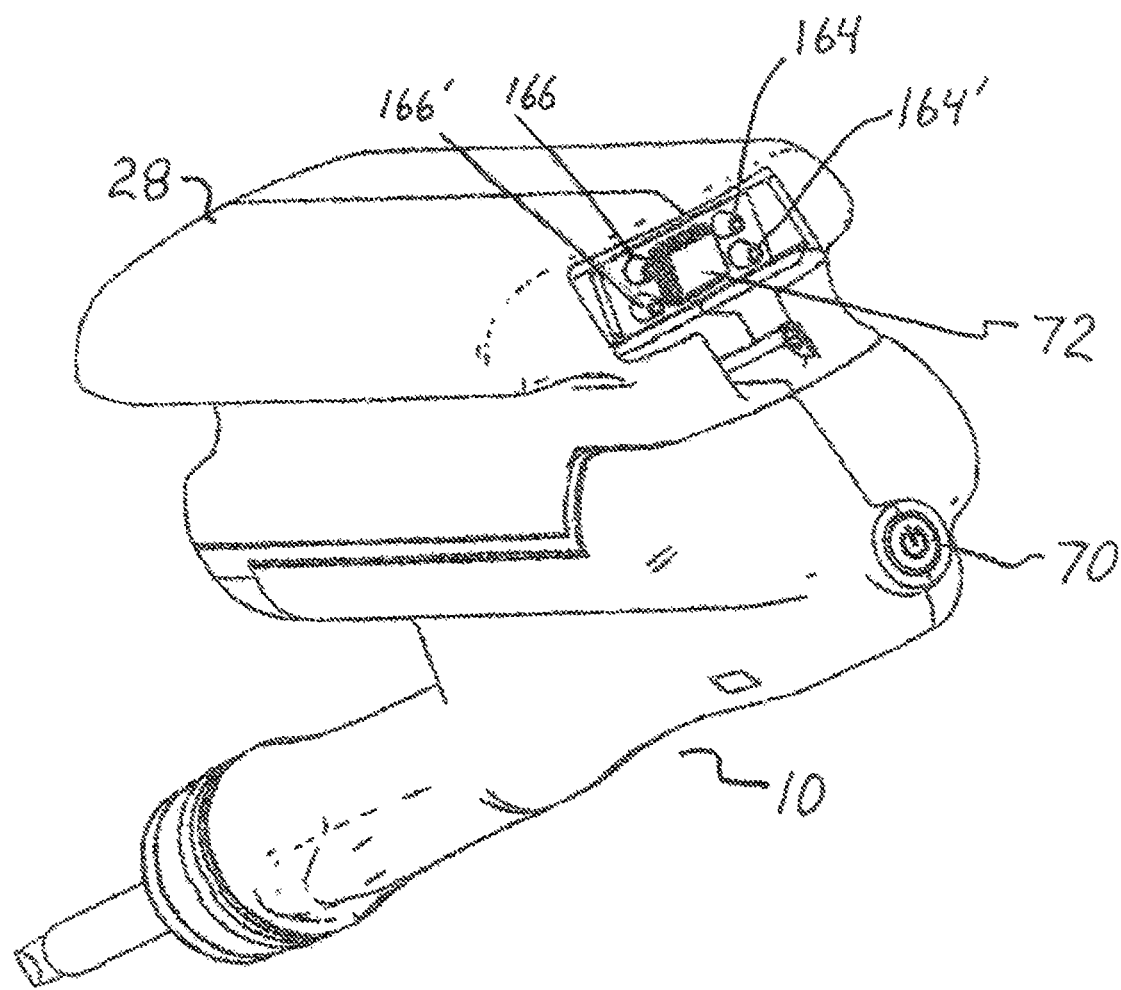
FIG. 5 is a rear perspective view of the cordless soldering iron and battery pack.

FIG. 4 is a front perspective view and FIG. 5 is a rear perspective view of the cordless soldering iron and battery pack. As depicted in the front perspective view of FIG. 4, the power supply battery pack 28 includes a magnet 72 (or magnetic material) to attractively engage the magnet 62 of the soldering iron holder 16. The power supply battery pack 28 also includes charge contacts 164 and 164' as well as supply contacts 166 and 166'. As depicted in the rear perspective view of the power supply battery pack of FIG. 5, The power supply battery pack 28 also includes a symmetrical set of charge contacts 164 and 164' as well as supply contacts 166 and 166' and a magnet 72, effectively identical to those elements on the front side of the power supply battery pack 28 to allow the power supply battery pack 28 to engage with the soldering iron holder 16 on either the front or rear face. The respective contacts of the power supply battery pack 28 electrically engage the respective contacts of the soldering iron holder to provide for electrical power coupling as discussed in greater detail below with respect to the schematic of FIG. 8.

Figure 6:
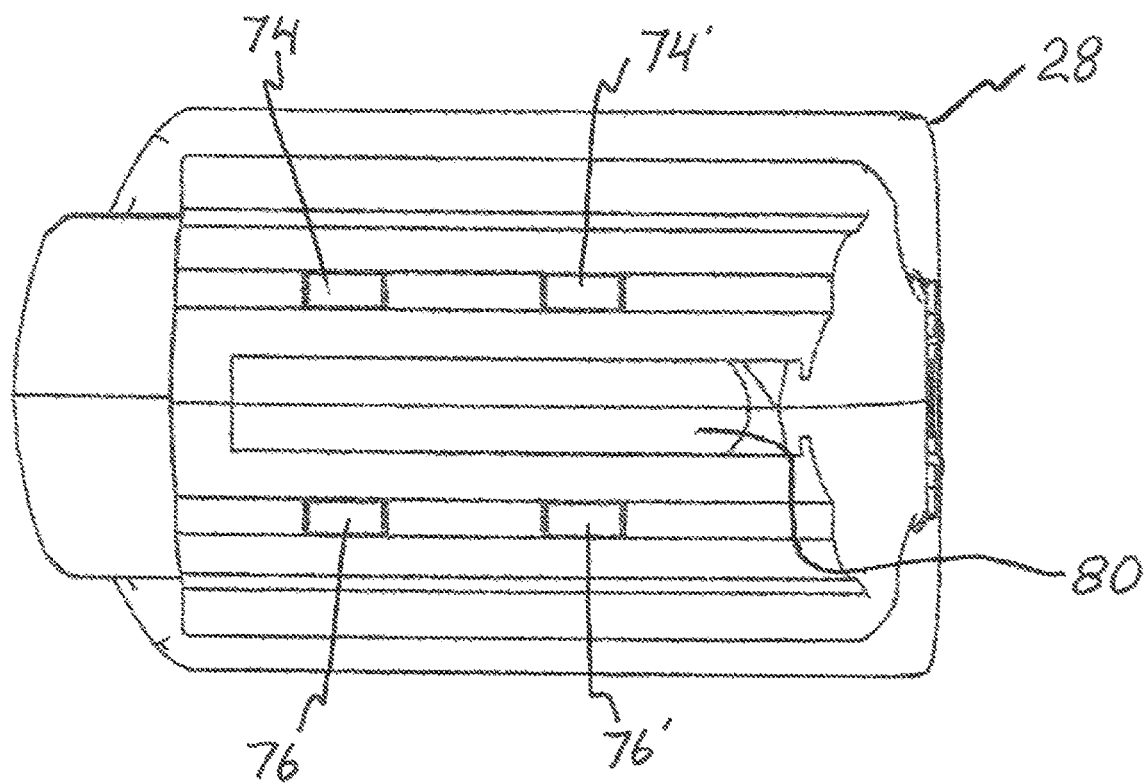
FIG. 6 is a bottom view of the battery pack.
Figure 7:
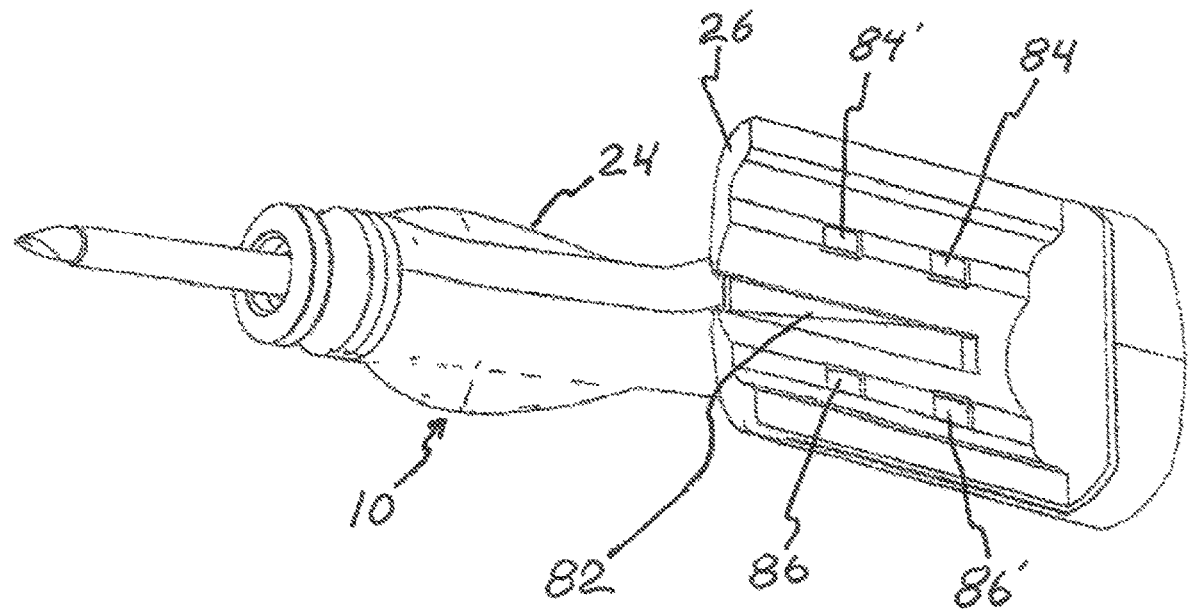
FIG. 7 is a top view of the cordless soldering iron.

FIG. 6 is a bottom view of the power supply battery pack 28 and FIG. 7 is a top view of the cordless soldering iron 10 without the power supply battery pack 28. The respective views of FIG. 6 and FIG. 7 illustrate an exemplary configuration for the mounting of the power supply battery pack 28 to the grip 24 of the cordless soldering iron 10 at its base 26. As depicted in FIG. 6, the bottom of the power supply battery pack 28 includes contacts 74 and 74' as well as contacts 76 and 76' and a centrally located rib 80. The base 26 of the cordless soldering iron 10 includes a channel 82 and contacts 84 and 84' as well as contacts 86 and 86'. The rib 80 of the power supply battery pack 28 is sized to fit within and engage channel 82 of the base 26 of the cordless soldering iron 10, to allow the power supply battery pack 28 to be securely mounted on the cordless soldering iron 10 with the respective contacts in electrical communication.

Figure 8:
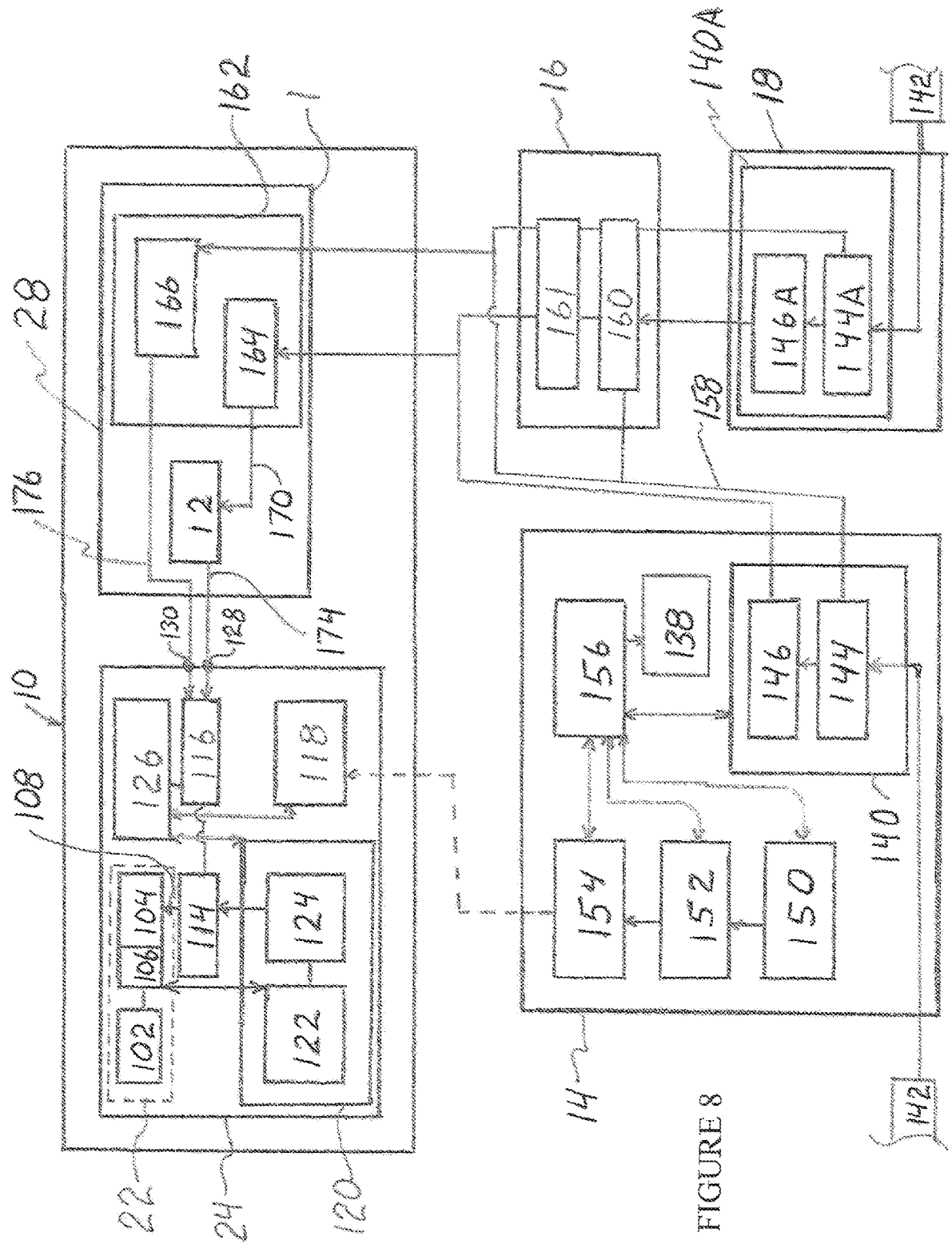
FIG. 8 is a schematic block diagram of the primary circuitry of the cordless soldering iron, battery pack, control station and charging station of the present invention.

FIG. 8 is a schematic box diagram depiction of the primary electrical circuitry of the cordless soldering iron 10, the power supply battery pack 28, control station 14, soldering iron holder 16 and charge station 18. The cartridge 22 of the cordless soldering iron 10 includes a tip 102, a heater 104, a tip temperature sensor 106 and electrical connections 108. In addition, the grip 24 of the cordless soldering iron 10 includes a power adjust circuit 114, a selecting circuit 116, a signal receiving circuit 118 and a heat control circuit 120. The heat control circuit 120 includes a temperature detecting sub-circuit 122 and a control signal creating sub-circuit 124. The circuits and sub-circuits of the cordless soldering iron 10 are preferably all connected to and operationally controlled by a central processing unit 126 in the cordless soldering iron 10, or optionally in the power supply battery pack 28.

The cordless soldering iron 10 is preferably removably attached to the power supply battery pack 28 with the rechargeable battery 12, as well as wiring circuits to provide power from the battery 12 to the respective circuit components of the cordless soldering iron 10. The cordless soldering iron 10 also includes a first line contact 128 and a second line contact 130.

The circuitry of the control station 14 depicted in the schematic box diagram of FIG. 2 includes a power source circuit 140 connectable to an external power supply 142. The power source circuit 140 includes a converter sub-circuit 144 and a charging sub-circuit 146. In addition, the control station 14 includes an input/output interface 150, target generating circuit 152 and a transmitter 154. The operation and control of the circuits 140, 144, 146, 152, interface 150 and transmitter 154 of the control station are managed by a central processing unit (CPU) 156 including a soldering system control program and associated memory. A connecting cable 158 electrically connects the control station 14 to the soldering iron holder 16.

The circuitry of the charge station 18 is similar to the power supply portion of the control station 14, and accordingly the circuitry of the charge station 18 includes a power source circuit 140A connectable to an external power supply 142, as well as a converter sub-circuit 144A and a charging sub-circuit 146A. The soldering iron holder 16 will be electrically connected to either the control station 14, or the charge station 18, but not both simultaneously. However, even when the control station 14 is not electrically coupled to the cordless soldering iron 10 through the soldering iron holder 16, the control station 14 can wirelessly control the operation of the cordless soldering iron 10.

As noted, the soldering iron holder 16 may be electrically connected to either the control station 14 or the charge station 18. The soldering iron holder 16 thus in effect simply includes conductors 160 and contacts 161 to pass the power delivered by the charging circuit 146 of the control station 14, or the charging circuit 146A of the charge station 18, to the power supply battery pack 28 that may be mounted to the cordless soldering iron 10.

The power supply battery pack 28 includes a power input circuit 162 having a first contact 164 and a second contact 166. The power supply battery pack 28 includes the battery 12 that is connected so as to be charged by the charging circuit 146 of the control station via the first contact 164 when the cordless soldering iron 10 with the power supply battery pack 28 are docked on the soldering iron holder 16. The soldering iron holder 16 is designed to hold and charge the battery 12 of the power supply battery pack 28 when the power supply battery pack 28 is docked on the soldering iron holder 16 and either attached to or detached from the cordless soldering iron 10.

Within the cordless soldering iron 10, when it is secured to the power supply battery pack 28 and mounted on the soldering iron holder 16, the selecting circuit 116 compares the voltage level provided by the battery 12 of the power supply battery pack 28 provided at first line contact 128 with that of the power provided by the control station 14 provided to second line contact 130. The selecting circuit 116 selects the higher power level to power the cordless soldering iron 10. When the cordless soldering iron 10 is separated from the soldering iron holder 16 and thus the control station 14, the voltage on the second line contact 130 drops to zero, and the first line contact 128 provides a voltage level depending on the amount of power and the charge level in the battery 12. When the cordless soldering iron 10 is secured to the power supply battery pack 28, and they are together mounted on the soldering iron holder 16, the power input circuit 162 of the power supply battery pack 28 is connected through the soldering iron holder 16 and the charging circuit 146 or converter 144 of the control station 14 to the external power source 142. DC voltage is provided to the second line contact 130 by the second contact 166 of the power input circuit 162 of the power supply battery pack 160. The voltage level on the second line contact 130 will then be higher than the voltage on the first line contact 128, and the cordless soldering iron 10 will be powered by the control station 14. The selecting circuit 116 within the cordless soldering iron 10 is preferably a voltage level controlled switching circuit.

In order to set and maintain the tip temperature of the tip 102 of the cartridge 22 in the cordless soldering iron 10, a target notification signal representing a target tip temperature is sent from the transmitter 154 of the control station 14 to the signal receiving circuit 118 of the cordless soldering iron 10. Within the heat control circuit 120 of the cordless soldering iron 10, the control signal creating sub-circuit 124 receives both a tip temperature signal from the temperature detect sub-circuit 122 provided by the tip temperature sensor 106 of the cartridge 100 and the target temperature from the signal receiving circuit 118, and using those two signal provides an input to the control signal creating sub-circuit 124, which executes feedback control of the power delivered to the heater 104.

The signal receiving circuit 118 of the cordless soldering iron 10 may be a WiFi circuit, a near field communication (NFC) circuit, a Bluetooth circuit, a radio frequency communication circuit, or radio frequency identification (RFID) circuit. If the receiving circuit 118 is an RFID circuit, the transmitter 154 of the control station 14 may be a RFID reader/writer. When a user brings the RFID receiving circuit 118 in the cordless soldering iron 10 close to the RFID reader/writer transmitter 154 in the control station 14, the heat control circuit 120 of the cordless soldering iron 10 can receive the target temperature setting information from the control station 14.

The control station 14 has an input interface circuit 138 connected to the input buttons 38 on the control station 14. The input interface circuit 138 may be operative with buttons 38 as depicted, or a dial to allow a user to input the target temperature. Alternatively, the input interface circuit 138 may be operative with a touch panel. Target temperature signal data is output to the cordless soldering iron 10 through the target signal generating circuit 152 and the transmitter 154. The cordless soldering iron 10 executes accurate feedback control using the target temperature input data. The target signal generating circuit 152 may be a microcomputer or signal generating circuit.

The power source circuit 140 of the control station 14 has the converter sub-circuit 144 and the charging sub-circuit 146. When charging the cordless soldering iron 10, the converter sub-circuit 144 supplies power to the cordless soldering iron 10 as well as the battery 12 through the charging sub-circuit 146. The power supplied from the converter sub-circuit 144 to the cordless soldering iron 10 may be used to maintain the tip temperature of the cartridge 22 while the battery 12 is being charged. After the battery 12 is charged, power stored in the battery 12 of the power supply battery pack 28 or power supplied through the power input circuit 162 provides all of the necessary power to the cordless soldering iron 10 to maintain the tip temperature, if the cordless soldering iron 10 is turned on.

The circuitry of the power supply battery pack 28 includes the power input circuit 162 and the battery 12. As the power supply battery pack 160 is detachable from the cordless soldering iron 10, the power input circuit 162 includes a first contact 164 and a second contact 166. There is a charging line 170 to conduct power to the battery 12 from the first contact 164. There is also a first supply line 174 to supply power from the battery 12 to contact 128 and there-through to the cordless soldering iron 10 when it is attached to the power supply battery pack 28. There is a second supply line 176 to supply power from the second contact 166 to the cordless soldering iron 10 without passing through the battery 12.

When charging the battery 12, power is brought from the power input circuit 162 through the charging line 170, and at the same time, power is brought from the power input circuit 162 to the cordless soldering iron 10 through the second supply line 176 to maintain the tip temperature of the cordless soldering iron 10. When using the cordless soldering iron 10, power is brought from the battery 12 to the selecting circuit 116 and then to the power adjust circuit 114 and then to the heater 104 of the cartridge 22 of the cordless soldering iron 10. When the charge of the battery 12 is insufficient, the user may still use the cordless soldering iron 10 as a corded soldering iron by connecting a cable (not shown) between the cordless soldering iron 10 and control station 14 or the chare station 18, though this configuration it is not cordless.

As discussed above, FIG. 1 shows the cordless soldering iron 10, the control station 14 and the soldering iron holder 16. There is a connecting cable 158 between the control station 14 and the soldering iron holder 16 which provides power converted into DC current by the converter sub-circuit 144 of the control station 14. While the soldering iron holder 16 supports the cordless soldering iron 10, the battery 12 of the cordless soldering iron 10 is being charged through the converter sub-circuit 144 and the charging sub-circuit 146. At the same time, the tip is kept heated by DC power supplied through the soldering iron holder 16.

As depicted in FIG. 1, the soldering system may include the charge station 18 which is only used for charging the cordless soldering iron 10. The charge station 18 does not have functions for changing the soldering cartridge tip temperature. When a workstation has only a charge station 18 and a soldering iron holder 16, the user at the workstation cannot set or change the temperature setting of the cartridge, and instead only administrator having a control station 14 can change the temperature settings. The charge station 18 may be omitted when the workstation includes the control station 14.

The cordless soldering iron 10 is detachably connected to the power supply battery pack 28, which incorporates the battery 12 to power the soldering iron cartridge 22. The grip 24 of the cordless soldering iron 10 also includes the base 26 which is designed to detachably mate with and securely affix to the power supply battery pack 28. The power adjust circuit 114, the selecting circuit 116, the signal receiving circuit 118, the heat control circuit 120, the temperature detecting sub-circuit 122 and the control signal creating sub-circuit 124 are all preferably located in the grip 24 of the cordless soldering iron 10, although they may alternatively be located within the power supply battery pack 28. The temperature detecting sensor 106 is located in the cartridge 22, and it is preferably integral with the heater 104. The base 26 supports and securely mounts to the power supply battery pack 28. The user can detach the power supply battery pack 28 from the base 26 of the grip 24 of the cordless soldering iron 10. Alternatively, the power supply battery pack 28 and the grip 24 of the cordless soldering iron 10 may be unified as a single assembly.

The cordless soldering iron 10 operates cooperatively with the control station 14 with a wireless communication system and a control program within the control station 14 executed by the CPU 156 of the control station 14. The primary subroutines of the control program are illustrated in the flow charts of FIGS. 9-13.

Figure 9:
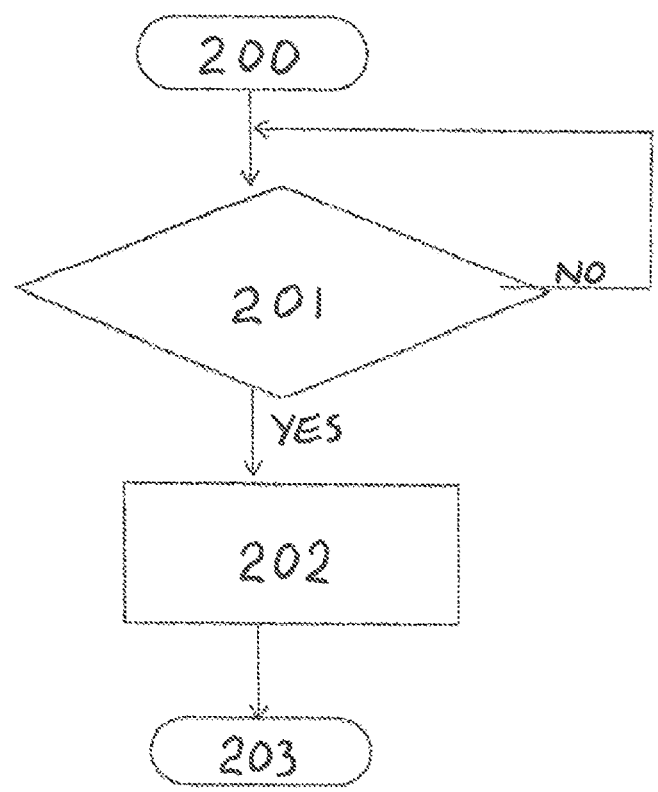
FIG. 9 is a flow chart depicting the functional operation of a first control program subroutine.

FIG. 9 is a flow chart depicting the functional operation of a first control program subroutine operative to allow the transfer of data from the control station 14 to the cordless soldering iron 10. The data transfer subroutine initiates at a start step 200. The program then proceeds to decision step 201 to determine if the wireless communication circuit is within range to establish a communication link, for example the RFID writer in the control station 14 detects and initiates communication with the RFID tag of the cordless soldering iron 10. If no communication link is established, the program returns to the beginning of step 201 to attempt to establish the communication link. If at step 201 the communication link is established, the program proceeds to step 202, where the control station 14 writes a set of data including the set temperature and the offset data (if any) to the receiver or RFID tag of the cordless soldering iron 202, thereby providing the initial temperature setting to the cordless soldering iron 10. Once the set temperature and the offset data are transferred to the cordless soldering iron 10, the program proceeds to step 203 and the program ends.

Figure 10:
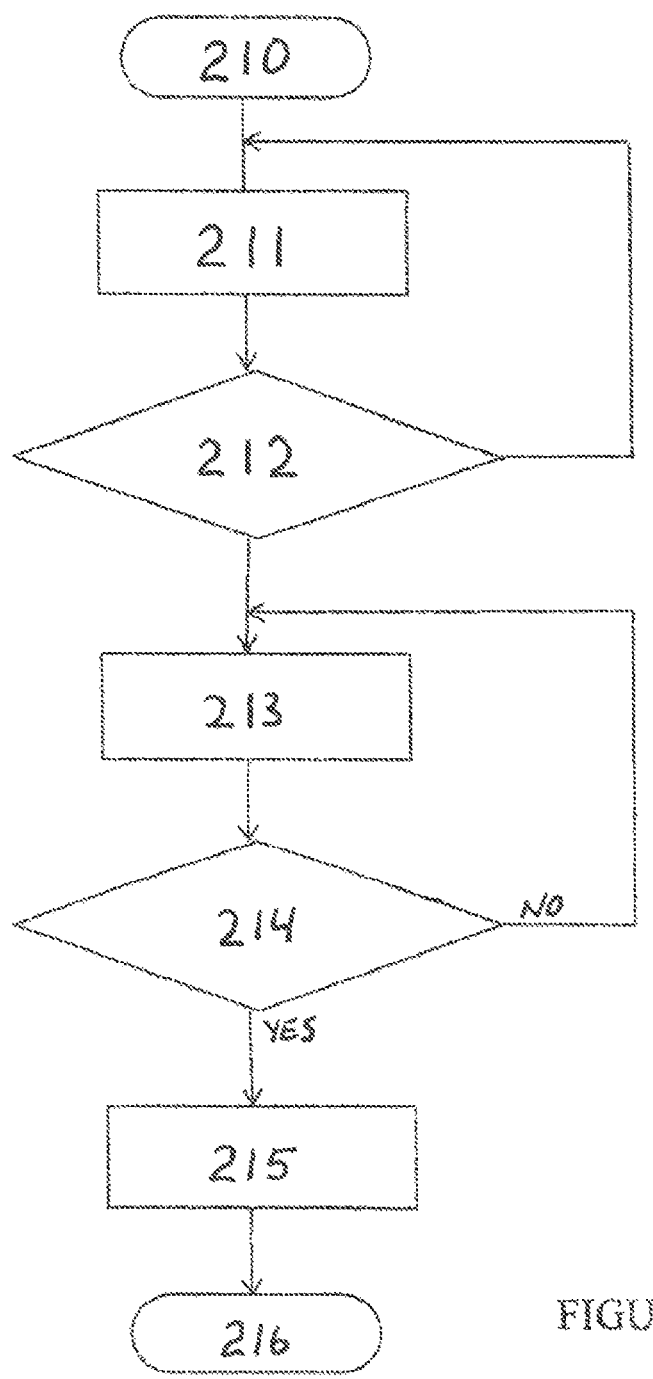
FIG. 10 is a flow chart depicting the functional operation of a second control program subroutine.

FIG. 10 is a flow chart depicting the functional operation of a display battery charge control program subroutine. The display battery charge subroutine initiates at a start step 210. The program then proceeds to step 211 where the program causes the display of the control station 14 to provide an indication (battery connected/battery not detected) as to whether the battery 12 is communicatively coupled to the control station 14. The program then proceeds to decision step 212 where the program causes the control station 14 to attempt to detect the battery 12. If at step 212 the battery 12 is not detected, then the program returns to the beginning of step 211 and the program causes the display to indicate that the battery is not detected. If however at decision step 212 the battery 12 is detected, then the program proceeds the step 213 where the program instructs the control station display to indicate that the battery 12 is detected and that the battery 12 is being charged. The program then proceeds to decision step 214 where the program determines if the battery 12 is fully charged. If at decision step 214 the program determines that the battery is not fully charged, the program returns to the beginning of step 213. If however at decision step 214 the program determines that the battery 12 is fully charges, the program proceeds to step 215 where the program causes the control station 14 to display that the battery 12 is fully charged and the program terminates the charging of the battery 12. After step 215, the program proceeds to end step 216 where the program terminates.

Figure 11:
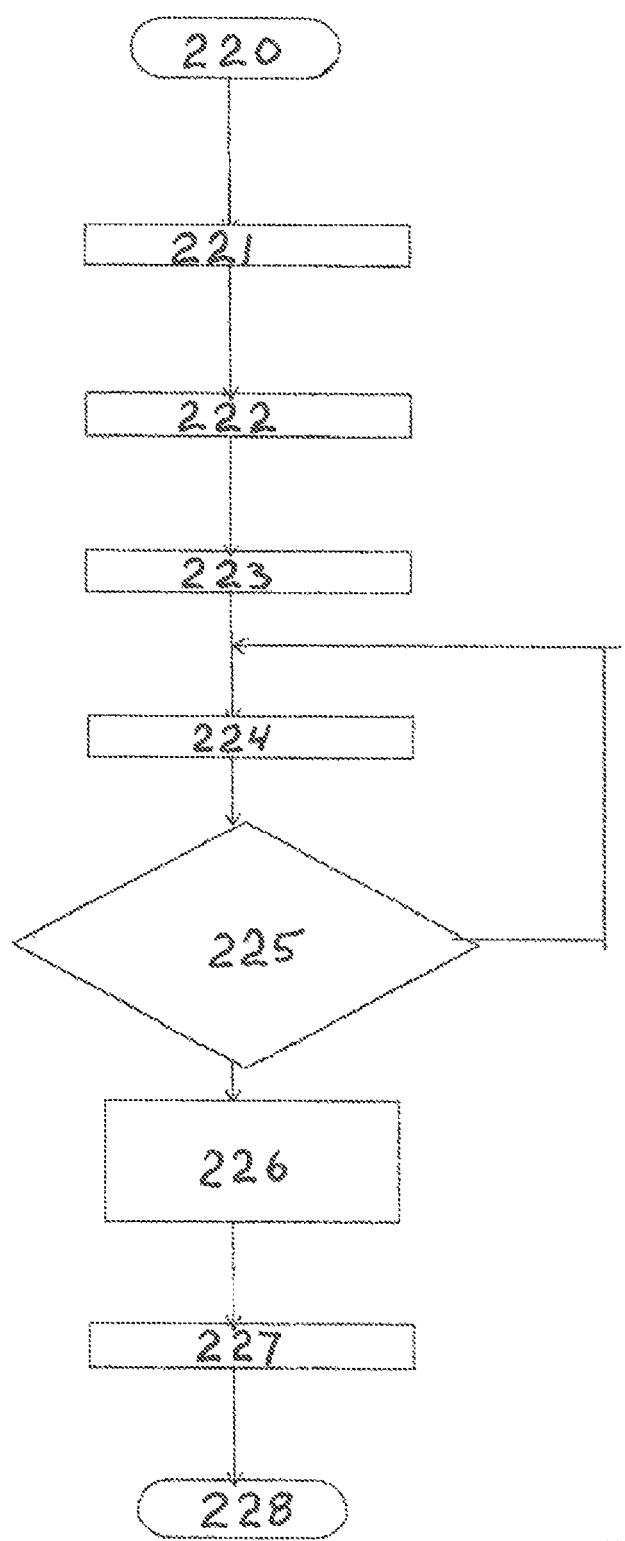
FIG. 11 is a flow chart depicting the functional operation of a third control program subroutine.

FIG. 11 is a flow chart depicting the functional operation of a temperature setting control program subroutine. The temperature setting program initiates at the start step 220, where the control station 14 is directed to initiate a temperature setting process. The program then proceeds to step 221 where the program causes the display to indicate a three digit temperature setting, and causes the third digit to flash. The user then uses the input buttons 38 to set the desired third digit temperature to complete step 221 of the program. Then the program proceeds to step 222 where the program causes the second digit of the temperature display to flash. The user then uses the input buttons 38 to set the desired second digit temperature to complete step 222 of the program. Then the program proceeds to step 223 where the program causes the first digit of the temperature display to flash. The user then uses the input buttons 38 to set the desired first digit temperature to complete step 223 of the program. Then the program proceeds to step 224 where the program causes the display to flash the entire three digit set temperature. The user then uses the input buttons 38 to accept the set point temperature flashing on the display and the program then proceeds to decision step 225. At decision step 225 the program determines if the wireless communication circuit is within range to establish a communication link, for example the RFID writer in the control station 14 detects and initiates communication with the RFID tag of the cordless soldering iron 10. If no communication link is established, the program returns to the beginning of step 224 and then proceeds to attempt to establish the communication link. If at decision step 225 the communication link is established, the program proceeds to step 226, where the control station 14 writes the set temperature to the receiver or RFID tag of the cordless soldering iron 10, or therethrough to the CPU 26, thereby providing the temperature setting to the cordless soldering iron 10. Once the set temperature is transferred to the cordless soldering iron 10, the program proceeds to step 227 and the program causes the set temperature display to stop flashing so that the user can see that the set temperature has been set within the cordless soldering iron 10. The program then proceeds to an end step 228.

Figure 12:
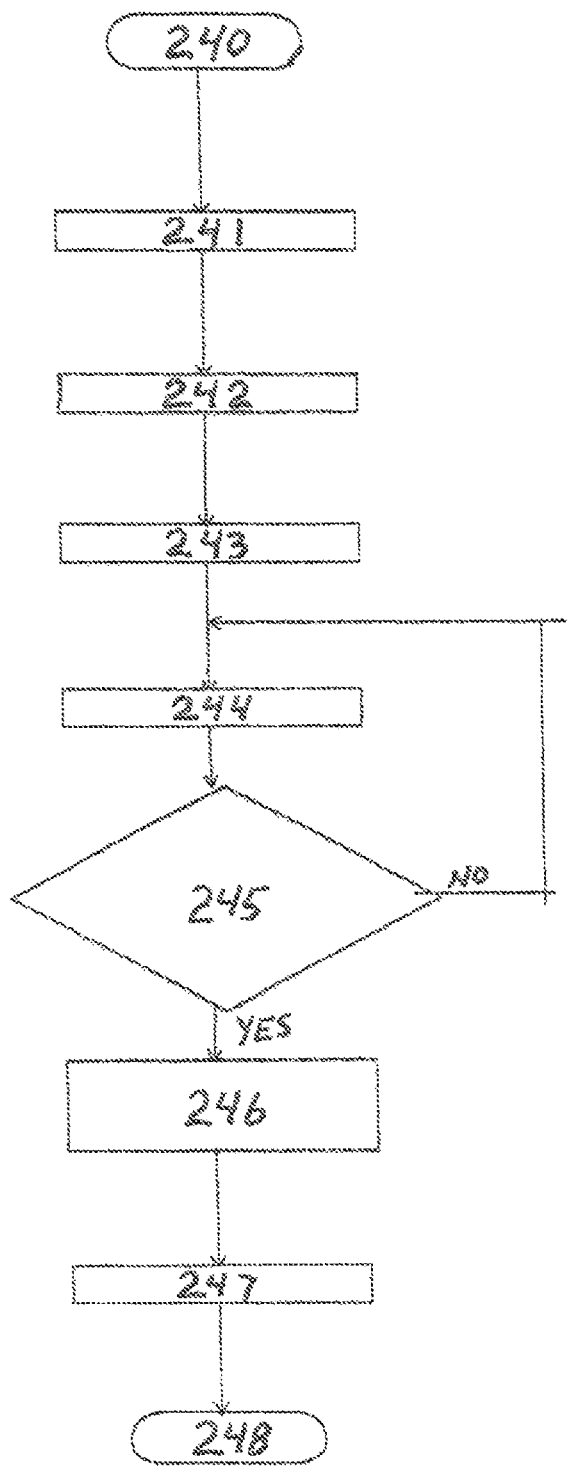
FIG. 12 is a flow chart depicting the functional operation of a fourth control program subroutine.

FIG. 12 is a flow chart depicting the functional operation of a change offset value control program subroutine. An offset value may be needed to adjust the amount of power delivered to a specific type of cartridge, or even a specific cartridge identified by the control station 14, when the cartridge does not achieve the desired set temperature when powered at the set point temperature power level. For example, if the cartridge set point temperature is set to 300 degrees Celsius, but an external thermometer determines that the tip temperature is actually 285 degrees Celsius, then the cartridge requires a plus 15 degree offset value. To allow a user to input an offset value, the control station runs the program of FIG. 12. The change offset value program initiates at start step 240, where the control station 14 is directed to initiate the offset setting process. The program then proceeds to step 241 where the program causes the display to indicate a three digit offset setting, and causes the third digit to flash. The user then uses the input buttons 38 to set the desired third digit offset to complete step 241 of the program. Then the program proceeds to step 242 where the program causes the second digit of the offset display to flash. The user then uses the input buttons 38 to set the desired second digit offset to complete step 242 of the program. Then the program proceeds to step 243 where the program causes the first digit of the offset display to flash. The user then uses the input buttons 38 to set the desired first digit offset to complete step 243 of the program. Then the program proceeds to step 244 where the program causes the display to flash the entire three digit offset. The user then uses the input buttons 38 to accept the offset flashing on the display and the program then proceeds to decision step 245. At decision step 245 the program determines if the wireless communication circuit is within range to establish a communication link, for example the RFID writer in the control station 14 detects and initiates communication with the RFID tag of the cordless soldering iron 10. If no communication link is established, the program returns to the beginning of step 244 and then proceeds to attempt to establish the communication link. If at decision step 245 the communication link is established, the program proceeds to step 246, where the control station 14 writes the offset as well as the set point temperature to the receiver or RFID tag of the cordless soldering iron 10, or there-through to the CPU 126, thereby providing the offset setting to the cordless soldering iron 10. Once the offset is transferred to the cordless soldering iron 10, the program proceeds to step 247 and the program causes the set temperature display to stop flashing so that the user can see that the offset and the temperature setting has been set within the cordless soldering iron 10. The program then proceeds to an end step 248.

Figure 13:
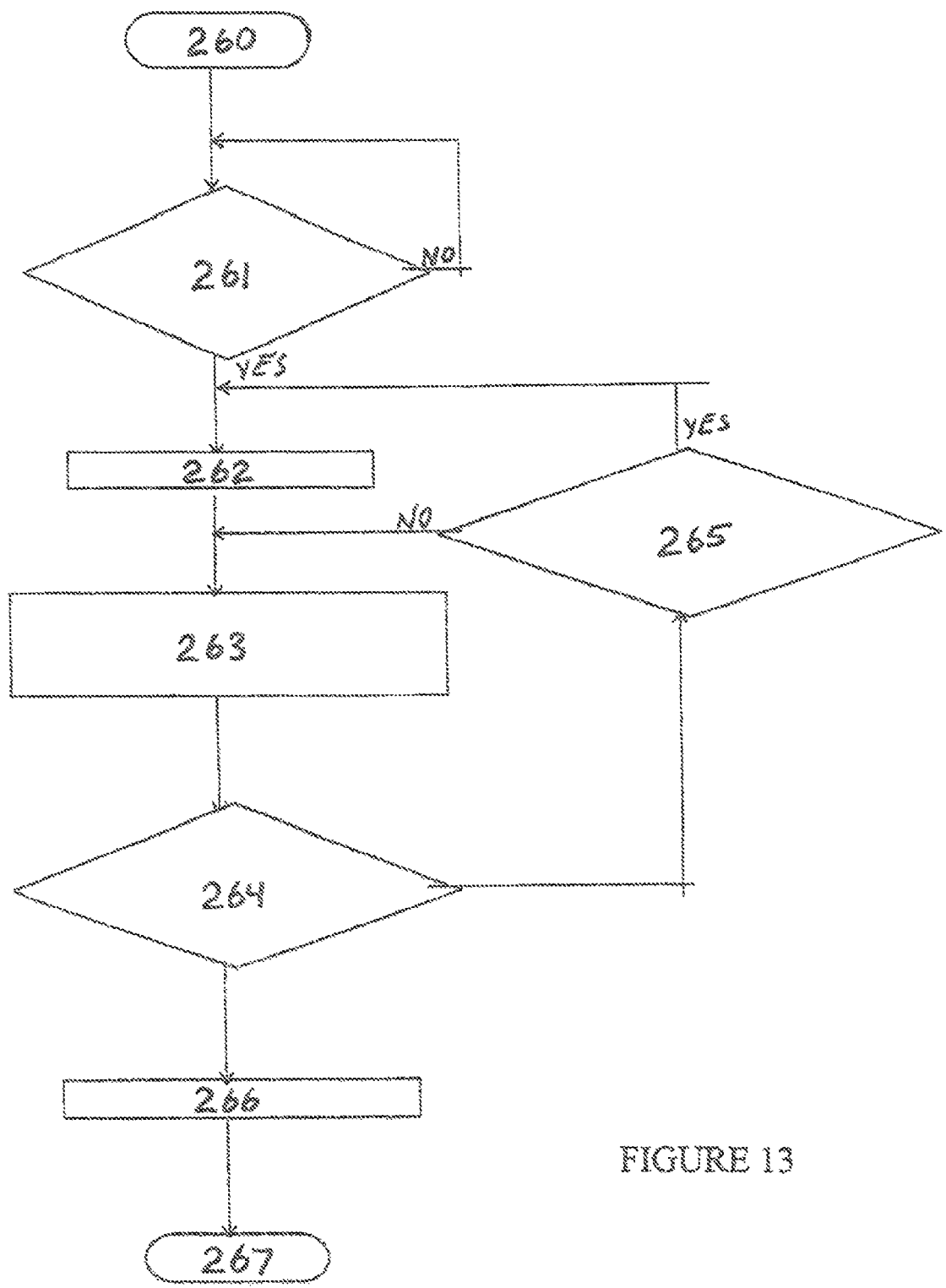
FIG. 13 is a flow chart depicting the functional operation of a fifth control program subroutine.

FIG. 13 is a flow chart depicting the functional operation of a cartridge heater control program subroutine. The control station 14 initiates the cartridge heater control program at start step 260, when the cordless soldering iron 10 is docked on the soldering iron holder 16 and the power switch of the control station 14 is "on". The program then advances to decision step 261, where the program controlling the cordless soldering iron 10 detects whether the power switch is "on". If the power switch is not "on", the program returns to the beginning of step 261. If at decision step 261 the control program confirms that the power switch is "on" then the program proceeds to step 262, where the program queries and reads the temperature setting data of the cartridge, for example by having the RFID reader read an RFID transponder or tag on the cartridge. Once the control program has the temperature setting data, the control program causes the cordless soldering iron to start supplying power to the cartridge's heater, at step 263. When the cordless soldering iron 10 begins providing power to the heater of the cartridge, the set point temperature will be higher than the tip temperature as measured by the tip temperature sensor. Accordingly, the program initiates a feedback control at step 263 where the set temperature is compared to the tip temperature as measured by the tip temperature sensor. Power is supplied to the heater of the cartridge until the tip temperature as measured by the tip temperature sensor is equal, or approximately equal, to the desired set point temperature. When the set point tip temperature is reached, as confirmed by the tip temperature as measured by the tip temperature sensor, the program proceeds to decision step 264, where the control program determines whether the cordless soldering iron has been turned off at its power switch. If at decision step 264 the program determines that the power switch is "on", the program advances to decision step 265, where the program determines whether a change in the temperature setting has been entered (for example with the programs of FIG. 11 or 12). If no change is detected, then the program returns to the beginning of step 263. However, if at decision step 265 a change of the set temperature or offset is detected, then the program returns to the beginning of step 262. When at decision step 264, the program determines that the power switch is "off", the program advances to step 266 where the program terminates the temperature control function before advancing to the end step 267.

Figure 14:
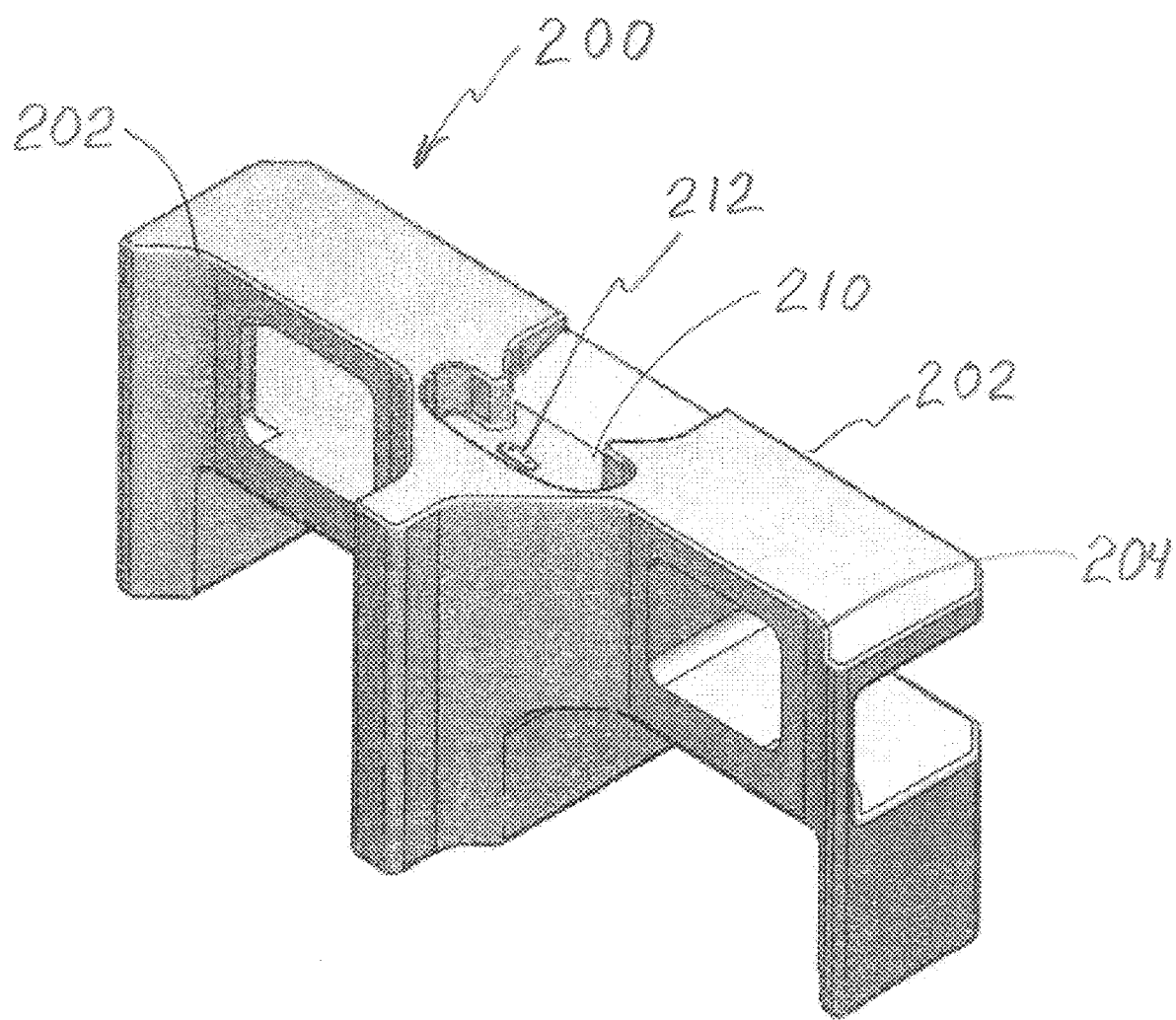
FIG. 14 is a perspective view of a positioning dock that may be used to assemble the soldering iron holder and the control station or charge station at a workstation.
Figure 15:
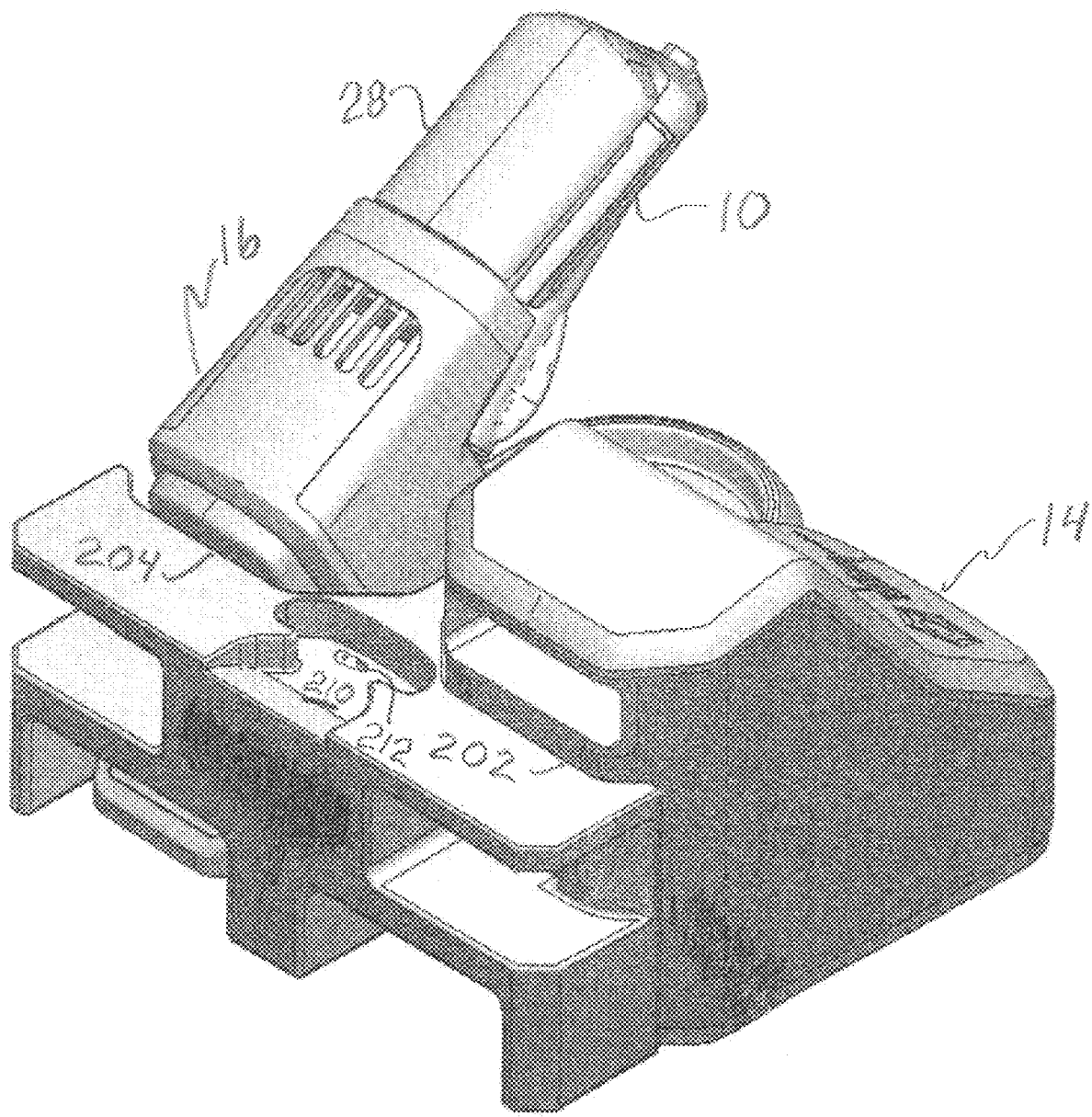
FIG. 15 is a perspective view of the positioning dock of FIG. 14 assembled with a soldering iron holder and a control station.

When placed at a soldering workstation, the system of the present invention includes the cordless soldering iron 10, which when not in use is docked on the soldering iron holder 16, and either the control station 14 or a charge station 18. It is preferable to maintain a clean and organized workstation, and accordingly the present invention further contemplates positioning the soldering iron holder 16 together the control station 14 or charge station 18. FIG. 14 is a perspective view of a positioning dock 200 and FIG. 15 is a perspective view of the positioning dock 200 of FIG. 14 assembled with a soldering iron holder 16 and a control station 14. Preferably the rear portions of the housings of the control station 14, soldering iron holder 16 and charge station 18 have the same configuration so that each unit may be attached to either side of the positioning dock 200. The positioning dock 200 has a frame 202 defining a first docking position 204 and a second docking position 206. The first and second docking positions 204 and 206 are symmetrical so that the control station 14, soldering iron holder 16 and charge station 18 may mounted in either docking position. Preferable, the positioning dock 200 includes internal cabling (not shown) and contacts to electrically connect the soldering iron holder 16 to either the control station 14 or the charge station 18. Alternatively, the positioning dock 200 may be configured to allow the use of an external cable to connect the soldering iron holder 16 to either the control station 14 or the charge station 18. The positioning dock 200 may also include a recess 210 with charge contacts 212, configured to match the shape of one end of the power supply battery pack 28, so that a spare power supply battery pack can be stored on the positioning dock 200 and charged when the control station 14 or charge station 18 is turned on.

The invention has been described in detail above in connection with the figures, however it should be understood that the system may include other components and enable other functions. For example, the control station 14 may not have the power supply circuit 140, instead the control station 14 may only be wirelessly connected to the cordless soldering iron 10 to provide tip temperature control. Further, the control station 14 may provide that the input interface must receive a password to allow the control station 14 to input a target tip temperature. As another alternative, the power source may be located in the soldering iron holder 16. In this case, the soldering iron holder 16 has the same circuits and functionality as the charge station 18 described above. Those skilled in the art will appreciate that the foregoing disclosure is meant to be exemplary and specification and the figures are provided to explain the present invention, without intending to limit the potential modes of carrying out the present invention. The scope of the invention is defined only by the appended claims and equivalents thereto.

The invention claimed is:

1. A cordless soldering iron comprising:
   a handle assembly;
   a power supply battery pack;
   signal receiving circuitry to receive wireless communications to program the cordless soldering iron with a tip temperature setting;
   heat control circuitry and a control program to execute feedback control of the power delivered to a soldering tip heater to maintain the soldering tip temperature at the programmed tip temperature setting; and
   a selecting circuit within said cordless soldering iron to compare power levels of two different inputs and select the higher power level to power the cordless soldering iron.

2. The cordless soldering iron of claim 1, wherein said circuitry to receive wireless communications further comprises one of a wireless networking protocol circuit, a near field communication (NFC) circuit, a short range wireless circuit, a radio frequency communication circuit, or a radio frequency identification (RFID) circuit.

3. The cordless soldering iron of claim 1, wherein said circuitry to execute feedback control of the power delivered to a soldering tip heater further comprises:
a power adjust circuit;
a heat control circuit;
and a programmed central processing unit.

4. The cordless soldering iron of claim 3, wherein said heat control circuit comprises a temperature detecting sub-circuit and a control signal creating sub-circuit.

5. The cordless soldering iron of claim 1, wherein said selecting circuit within said cordless soldering iron maintains the tip temperature while a battery in said power supply battery pack is being charged.

6. The cordless soldering iron of claim 5, wherein said power supply battery pack further comprises:
a power input circuit;
a rechargeable battery connected to said power input circuit; and
output wiring and contacts to electrically couple said battery to said selecting circuit of said cordless soldering iron.

7. The cordless soldering iron of claim 4, further comprising:
a soldering cartridge having a heater, a soldering tip and a temperature sensor to provide a tip temperature signal to said heat control circuitry.

8. The cordless soldering iron of claim 7, further comprising:
a control program within said CPU of said cordless soldering iron to receive a tip temperature data signal from said temperature detecting sub-circuit and a tip temperature setting from said control signal sub-circuit, comparing the two signals, and adjusting the power delivered to the cartridge until the measured tip temperature data signal is equal to the tip temperature setting.

9. The cordless soldering iron of claim 7, further comprising:
a control program within said CPU of said cordless soldering iron to receive an offset signal from said signal receiving circuit and for adjusting the power level delivered to said cartridge based upon the offset signal.

10. The cordless soldering iron of claim 1, wherein
said power supply battery pack having a first supply line to couple power from said battery to said selecting circuit and a second supply line to couple power form an external power supply to said selecting circuit.

11. A cordless soldering iron comprising:
a handle assembly;
signal receiving circuitry to receive wireless communications to program the cordless soldering iron with a tip temperature setting;
heat control circuitry and a control program to execute feedback control of the power delivered to a soldering tip heater to maintain the soldering tip temperature at the programmed tip temperature setting, said heat control circuitry including a power adjust circuit, a heat control circuit and a programmed central processing unit;
a soldering cartridge having a heater, a soldering tip and a temperature sensor to provide a tip temperature signal to said heat control circuitry;
a power supply battery pack comprising a power input circuit, a rechargeable battery connected to said power input circuit, and output wiring and contacts to electrically couple said battery to said selecting circuit of said cordless soldering iron; and
a selecting circuit within said cordless soldering iron to compare power levels of two different inputs and select the higher power level to power the cordless soldering iron.

12. The cordless soldering iron of claim 11, wherein said circuitry to receive wireless communications further comprises one of a wireless networking protocol circuit, a near field communication (NFC) circuit, a short range wireless circuit, a radio frequency communication circuit, or a radio frequency identification (RFID) circuit.

13. A soldering system comprising:
a cordless soldering iron having a handle assembly, a power supply battery pack, signal receiving circuitry to receive wireless communications to program the cordless soldering iron with a tip temperature setting, and heat control circuitry and a control program to execute feedback control of the power delivered to a soldering tip heater to maintain the soldering tip temperature at the programmed tip temperature setting;
a control station to provide wireless temperature setting programming to said cordless soldering iron; and
a selecting circuit within said cordless soldering iron to compare power levels of two different inputs and select the higher power level to power the cordless soldering iron.

14. The soldering system of claim 13, wherein said control station further comprises:
an input/output interface;
a target generating circuit;
a transmitter; and
a programmed central processing unit to control said input/output interface, said target generating circuit and said transmitter.

15. The soldering system of claim 13, wherein said control station further comprises:
a power source circuit including a converter sub-circuit and a charging sub-circuit.

16. The soldering system of claim 13 wherein said control station further comprises:
an input/output interface;
a target generating circuit;
a transmitter;
a programmed central processing unit to control said input/output interface, said target generating circuit and said transmitter; and
a power source circuit including a converter sub-circuit and a charging sub-circuit.

17. The soldering system of claim 13 further comprising a soldering iron holder to allow docking and recharging of said power supply battery pack.

18. The soldering system of claim 17 wherein said soldering iron holder includes a housing and cordless soldering iron mounting rods, said housing including a chamber to surround the heated portions of said cordless soldering iron when the cordless soldering iron is docked on the soldering iron holder.

19. The soldering system of claim 13 further comprising a charging station electrically coupled to a power supply and to a soldering iron holder, said charging station further comprising a power source circuit including a converter sub-circuit and a charging sub-circuit.

20. The soldering system of claim 13 wherein said control station and cordless soldering iron execute a control program including at least one of: a subroutine operative to allow and control the transfer of data from said control station to said cordless soldering iron; a display battery charge control program subroutine; a temperature setting control program subroutine; a change offset value control program subroutine; and a cartridge heater control program subroutine.

21. The soldering system of claim 17 further comprising a positioning dock for assembling said control station and said soldering iron holder together.

* * * * *